United States Patent
Jones et al.

(10) Patent No.: US 6,765,054 B1
(45) Date of Patent: Jul. 20, 2004

(54) ETHYLENE-VINYL ACETATE HOT MELT ADHESIVE COMPOSITION AND ARTICLE AND METHOD INCORPORATING THE SAME

(75) Inventors: Cheryl A. Jones, New Brighton, MN (US); Leonora Chernyak, Toronto (CA)

(73) Assignee: H. B. Fuller Licensing & Financing Inc., St. Paul, MN (US)

( * ) Notice: Subject to any disclaimer, the term of this patent is extended or adjusted under 35 U.S.C. 154(b) by 122 days.

(21) Appl. No.: 10/172,858

(22) Filed: Jun. 17, 2002

Related U.S. Application Data

(63) Continuation of application No. 10/128,878, filed on Apr. 24, 2002, now abandoned.

(51) Int. Cl.$^7$ .......................... C08L 31/04; C08L 57/02; C09J 131/04; C09J 157/02
(52) U.S. Cl. ....................... 524/524; 524/499; 525/221
(58) Field of Search ................................ 524/524, 499; 525/221

(56) References Cited

U.S. PATENT DOCUMENTS

| | | | |
|---|---|---|---|
| 4,167,433 A | * 9/1979 | Lakshmanan | ............... 156/322 |
| 4,497,941 A | 2/1985 | Aliani et al. | ................. 526/331 |
| 4,728,688 A | 3/1988 | Tizzard et al. | .............. 524/504 |
| 4,960,295 A | 10/1990 | Bodouroglou | ............. 281/15.1 |
| 5,041,482 A | 8/1991 | Ornsteen et al. | ............ 524/272 |
| 5,061,262 A | * 10/1991 | Chen et al. | ................. 604/389 |
| 5,373,049 A | 12/1994 | Ornstern et al. | ............ 524/487 |
| 5,685,758 A | * 11/1997 | Paul et al. | .................. 442/409 |
| 6,331,223 B1 | * 12/2001 | Wylie et al. | ................ 156/160 |
| 6,568,399 B1 | * 5/2003 | Wieczorek et al. | ........... 131/90 |

FOREIGN PATENT DOCUMENTS

| | | |
|---|---|---|
| JP | 53147733 | 12/1978 |
| JP | 10130436 | 5/1998 |

* cited by examiner

Primary Examiner—Peter Szekely

(57) ABSTRACT

A hot melt adhesive composition that includes a first ethylene-vinyl acetate copolymer including from about 25% vinyl acetate to about 30% vinyl acetate based upon the weight of the first copolymer and having a melt index of no greater than 4 g/10 min, a second ethylene-vinyl acetate copolymer that includes no greater than about 28% vinyl acetate based upon the weight of the second copolymer and having a melt index of from about 400 g/10 min to about 2500 g/10 min, and hydrogenated petroleum hydrocarbon resin.

28 Claims, No Drawings

ETHYLENE-VINYL ACETATE HOT MELT ADHESIVE COMPOSITION AND ARTICLE AND METHOD INCORPORATING THE SAME

This application is a continuation of U.S. patent application Ser. No. 10/128,878, filed Apr. 24, 2002, now abandoned.

BACKGROUND

The invention relates to bonding substrates through an ethylene-vinyl acetate hot melt adhesive composition.

Edgebanding is a process that involves bonding a strip of material, or edgeband, to a side edge of a wood substrate to cover the edge. Edgebands are applied to edges for various reasons including to cover exposed laminations, to create a more substantial panel appearance by attaching a thick edge, or to decorate the edge with a more finished or contrasting appearance. Examples of edgeband materials include wood, polyvinyl chloride, polypropylene, melamine, paper, laminate, and acrylonitrile butadiene styrene.

Specific types of edgebanding processes include "straight," "soft forming" and "contour banding." Soft forming includes applying an adhesive composition to a strip of material and then applying the strip to a base substrate that has formed, e.g., curved or rounded, edges. Contour banding involves applying the adhesive to the edgeband material and then applying the edgeband to the base substrate so that the edgeband follows the contours of the base substrate.

The hot melt adhesive compositions that are used to bond the edgeband to the base substrate are typically "unfilled" or "filled." Unfilled hot melt adhesive compositions are usually applied to a substrate with an applicator roller and tend to string. Stringing occurs when the composition fails to provide a neat break during a coating process resulting in the formation of long string-like strands of composition. The strings are carried away by the substrate being coated, and, upon finally breaking, snap back on the applicator roller, snap back on the board being coated, or are thrown from the coating apparatus. The stringing creates maintenance issues in that the strings must be removed from the board being coated and the pressure rollers. The buildup of strings on the pressure rollers can cause build up of adhesive on the boards.

Fillers have been added to hot melt adhesive compositions to reduce the stringing of the adhesive from the roller. Fillers have also been added to hot melt adhesives to decrease the cost of the adhesive and to improve the break action of the adhesive such that it provides a clean break from the roller during application. Fillers tend to dull saw blades and increase the viscosity of the adhesive over time at elevated temperatures.

During edgebanding, the hot melt adhesive is maintained in the molten state in the glue pot of the edgebanding apparatus for extended periods of time. The prolonged exposure to heat can cause the adhesive composition to darken in color, which can be aesthetically undesirable for an end product incorporating the adhesive. Hot melt adhesive compositions also tend to char after prolonged exposure to heat. The char sticks to the glue pot, rendering clean up difficult.

SUMARY

In one aspect, the invention features a hot melt adhesive composition that includes a) a first ethylene-vinyl acetate copolymer includes from about 25% vinyl acetate to about 30% vinyl acetate based upon the weight of the first copolymer and having a melt index of no greater than 4 g/10 min, b) a second ethylene-vinyl acetate copolymer includes no greater than about 28% vinyl acetate based upon the weight of the second copolymer and having a melt index of from about 400 g/10 min to about 2500 g/10 min, and c) hydrogenated petroleum hydrocarbon resin. In one embodiment, the second ethylene-vinyl acetate copolymer has a melt index from about 400 g/10 min to about 800 g/10 min. In another embodiment, the second ethylene-vinyl acetate copolymer has a melt index from 400 g/10 min to about 600 g/10 min. In some embodiments, the second ethylene-vinyl acetate copolymer comprises no greater than 20% vinyl acetate based upon the weight of the second copolymer. In other embodiments, the second ethylene-vinyl acetate copolymer comprises from about 14% to about 20% vinyl acetate based upon the weight of the second copolymer. In another embodiment, the second ethylene-vinyl acetate copolymer comprises from about 16% to about 20% vinyl acetate based upon the weight of the second copolymer.

In one embodiment, the hot melt adhesive composition includes from about 30% by weight to about 55% by weight the first ethylene-vinyl acetate copolymer. In other embodiments, the hot melt adhesive composition includes from about 15% by weight to about 30% by weight the second ethylene-vinyl acetate copolymer. In other embodiments, the hot melt adhesive composition of claim 1 includes from about 30% by weight to about 55% by weight the first ethylene-vinyl acetate copolymer, and from about 15% by weight to about 30% by weight the second ethylene-vinyl acetate copolymer.

In some embodiments, the hot melt adhesive composition includes from about 40% by weight to about 50% by weight the first ethylene-vinyl acetate copolymer, and from about 15% by weight to about 25% by weight the second ethylene-vinyl acetate copolymer. In other embodiments, the hot melt adhesive composition includes from about 25% by weight to about 40% by weight hydrogenated petroleum hydrocarbon resin. In another embodiment, the hot melt adhesive composition includes from about 30% by weight to about 40% by weight hydrogenated petroleum hydrocarbon resin.

In another embodiment, the hot melt adhesive composition further includes an agent selected from the group consisting of pigment, dye, and combinations thereof. In some embodiments, the pigment is selected from the group consisting of titanium dioxide, carbon black, compounded pigments, and combinations thereof.

In other embodiments, the composition, when molten, appears clear to the human eye. In one embodiment, the composition exhibits a Molten Gardner color of no greater than 4. In other embodiments, the composition exhibits a Molten Gardner color of no greater than 3. In another embodiment, the composition exhibits a Molten Gardner color of no greater than 2.

In one embodiment, the composition is essentially free of stringing when used in an edgebanding apparatus in which the composition is applied to a substrate using a roller at a substrate speed of at least 10 meters/minute. In another embodiment, the composition is essentially free of stringing when used in an edgebanding apparatus in which the composition is applied to a substrate using a roller at a substrate speed of at least 50 meters/minute.

In one embodiment, the composition exhibits a viscosity of no greater than 140,000 centipoise at 204° C. In another embodiment, the composition exhibits a viscosity of from about 80,000 centipoise to about 140,000 centipoise at 204° C. In other embodiments, the composition exhibits a viscosity of from about 100,000 centipoise to about 130,000 centipoise at 204° C.

In some embodiments, the composition is essentially free of inorganic filler. In other embodiments, the composition further includes antioxidant.

In one embodiment, the composition exhibits no greater than 50% change in viscosity over a period of 200 hours at 204° C. the composition exhibits no greater than 30% change in viscosity over a period of 200 hours at 204° C.

In other embodiments, the hot melt adhesive composition includes a) a fist ethylene-vinyl acetate co polymer includes from about 25% vinyl acetate to about 30% vinyl acetate based upon the weight of the first co polymer and having a melt index of no greater than 4 g/10 min, b) a second ethylene-vinyl acetate copolymer includes from about 16% vinyl acetate to about 20% vinyl acetate based upon the weight of the second copolymer and having a melt index of from about 400 g/10 min to about 600 g/10 min, c) hydrogenated petroleum hydrocarbon resin, and d) antioxidant.

In another aspect, the invention features a method of bonding two substrates through a hot melt adhesive composition, the method includes contacting a first substrate with an adhesive composition described herein, and contacting the adhesive composition with a second substrate. In one embodiment, the method includes applying the composition to the first substrate at a coating weight from about 9 g/ft$^2$ to about 20 g/ft$^2$. In some embodiments, the method includes applying the composition to the first substrate at a coating weight from about 9 g/ft$^2$ to about 17 g/ft$^2$.

In other embodiments, the method further includes applying heat and pressure to the construction. In another embodiment, the contacting includes roller coating the adhesive composition onto the substrate. In some embodiments, the first substrate includes wood or a wood product. In other embodiments, the first substrate is a composite that includes cellulose fibers and binder composition.

In another embodiment, the first substrate is selected from the group consisting of particle board, fiber board, chip board, hard board, oriented strand board, and plywood.

In other embodiments, the first substrate comprises wood, and contacting the first substrate includes contacting an edge of the first substrate with the composition. In some embodiments, the second substrate is selected from the group consisting of wood, wood product, plastic, paper, and combinations thereof.

In some embodiments, the method includes edgebanding, soft forming, or contour banding.

In other aspects, the invention features an article that includes a first substrate, a second substrate bonded to the first substrate through a hot melt adhesive composition described herein. In one embodiment, the first substrate includes wood or a wood product. In other embodiments, the first substrate includes a composite includes cellulose fibers and binder composition. In some embodiments, the first substrate is selected from the group consisting of particle board, fiber board, chip board, hard board, oriented strand board, and plywood. In other embodiments, the first substrate includes wood, contacting the first substrate includes contacting an edge of the first substrate with the composition. In some embodiments, the second substrate is selected from the group consisting of wood, wood product, plastic, paper, and combinations thereof. In other embodiments, the article is selected from the group consisting of furniture, shelves, closet organizers, counter tops, and doors.

The hot melt adhesive composition is well suited to bonding an edgeband to wood and wood products. The composition can be applied at a relatively low coating weight while maintaining good adhesive bond strength, and exhibits good heat resistance and heat stability. The composition also breaks cleanly during a high speed edgeband coating operation resulting in low amounts of stringing.

Other features of the invention will be apparent from the following description of the preferred embodiments thereof, and from the claims.

DETAILED DESCRIPTION

The hot melt adhesive composition includes two ethylene-vinyl acetate copolymers and a hydrogenated petroleum hydrocarbon resin. The composition exhibits good heat stability. One measure of heat stability is the absence or minimal presence of char when the composition is heated to its melt temperature and maintained at its melt temperature over an extended period of time. Preferably the composition is free of charring for extended periods of time, preferably when heated for a period of at least 200 hours at 204° C. Another measure of heat stability is the change in the composition's viscosity when the composition is maintained at its melt range over a period of time. Preferably the composition exhibits less than 50% change in viscosity when held at 204° C. for at least 200 hours, more preferably less than 30%, most preferably less than 27%. Another measure of heat stability is the change in color or lack in change in color of the composition when held at elevated temperatures for extended periods of time. Preferably the hot melt adhesive composition exhibits a Molten Gardner color of no greater than 10 after 200 hours at 204° C.

For some applications it is desirable that the composition be visibly clear and colorless. The composition can be formulated to be clear and free of color when in the molten state. Preferably the composition exhibits a Molten Gardner color of from 1 to 4, more preferably from 1 to 2, most preferably 1.

The composition also exhibits good heat resistance, i.e., the ability to maintain an adhesive bond to two substrates when heated. The composition preferably exhibits heat resistance to a temperature of at least 60° C., preferably from about 60° C. to about 90° C., more preferably from about 70° C. to about 80° C., most preferably about 75° C.

The composition is preferably formulated to exhibit a viscosity suitable for application using an edgebanding apparatus. The composition preferably exhibits a viscosity of no greater than 140,000 centipoise (cps) at 204° C., more preferably from about 80,000 cps to about 140,000 cps at 204° C., most preferably from about 100,000 cps to about 130,000 cps at 204° C., a ring and ball softening point of from about 105° C. to about 118° C., and a specific gravity of from about 0.94 to about 0.99.

The first ethylene-vinyl acetate copolymer of the hot melt adhesive composition includes from about 25% vinyl acetate to about 30% vinyl acetate, more preferably about 28% vinyl acetate based upon the weight of the first copolymer and has a melt index of no greater than 4 g/10 min, more preferably from about 2 g,10 min to 4 g/10 min, most preferably about 3 g/10 min. The first ethylene-vinyl acetate copolymer is preferably present in the composition in an amount of from 30% by weight to about 55% by weight, more preferably from about 40% by weight to about 50% by weight, most preferably about 45% by weight.

The second ethylene-vinyl acetate copolymer includes no greater than 28% vinyl acetate, preferably no greater than 20% vinyl acetate, more preferably from about 14% vinyl acetate to about 20% vinyl acetate, most preferably from about 16% vinyl acetate to about 20% vinyl acetate based upon the weight of the second copolymer, and has a melt index of from about 400 g10 min to about 2500 g/10 min, more preferably from about 400 g/10 min to about 800 g/10 min, most preferably from about 400 g/10 min to about 600 g/10 min. The second ethylene-vinyl acetate copolymer is preferably present in the composition in an amount of from 15% by weight to about 30% by weight, more preferably from about 15% by weight to about 25% by weight, most preferably about 19% by weight.

Useful commercially available ethylene-vinyl acetate copolymers are available under the ATEVA series of trade designations including, e.g., ATEVA 2803A an ethylene vinyl acetate polymer having a vinyl acetate content of 28% and a melt index of 3 g/10 min, and ATEVA 1880A an ethylene-vinyl acetate polymer having a vinyl acetate content of 18% and a melt index of from 400 g/10 min to 600 g/10 min.

Examples of suitable commercially available hydrogenated petroleum hydrocarbon resins include EASTOTAC H100R hydrogenated hydrocarbon $C_{6-20}$ resin (Eastman Chemical Co., Kingsport, Tenn.), ESCOREZ 5300 series, ESCOREZ 5400 series, and ESCOREZ 5415 hydrogenated hydrocarbon resins (Exxonmobil Chemical, Houston Tex.), SUKAOREZ SU120 hydrogenated-dycyclopentadiene hydrocarbon ($C_5$) resin (Tryline Company, Inc., Seattle, Wash.), REGALREZ 1100 series of hydrogenated hydrocarbon resins (Hercules Inc., Wilmington, Del.) and ARKON P series of hydrogenated hydrocarbon resins (Arkawa Chemicals Inc., Chicago, Ill.). The composition includes hydrogenated petroleum hydrocarbon resin in an amount of from 25% by weight to about 40% by weight, more preferably from about 30% by weight to about 40% by weight.

The composition also includes antioxidant. Antioxidant is present in the composition in an amount no greater than 1% by weight, more preferably from about 0.3% by weight to about 0.8% by weight.

The composition can also include other additives including, e.g., pigment (e.g., titanium dioxide, carbon black, compounded pigments including, e.g., pigments in ethylene-vinyl acetate, e.g., EVA-BROWN available from Clariant (Minneapolis, Minn.)), dyes, stabilizers, wax, extenders and modifiers. Pigment and dye can be added to the composition to achieve a desired color (e.g., to match the color of the exterior of the substrate). Preferably pigment is present in the composition in an amount no greater than 8% by weight, more preferably no greater than 5% by weight.

The composition is preferably formulated to be free of inorganic fillers including, e.g., salts of various metal cations, metal oxides, clays, calcium carbonate, zinc oxide, silicon dioxide, calcium phosphate, talk, barium sulfate, and sodium sulfate.

The composition can be provided in various forms including, e.g., pelletized beads, chips, pillows, and drums.

The composition can be used to bond a variety of substrates including, e.g., wood and wood products including, e.g., cellulose fiber composites, cellulose flake composites, particle board, fiber board, chip board, hard board, oriented strand board, plywood, laminates, melamine, paper, plastic including, e.g., polyvinyl chloride, polypropylene, laminates, and acrylonitrile butadiene styrene. The composition is particularly well suited for use in the wood working industry in general and for bonding wood laminates, wood oil veneers, and composite wood laminates in particular. The composition can be applied at various coating weights to achieve good adhesive bond. Preferably the composition is applied at a coating weight from about 9 $g/ft^2$ to about 20 $g/ft^2$, more preferably from about 9 $g/ft^2$ to about 17 $g/ft^2$.

The composition can be applied to a substrate using various processes including, e.g., edgebanding, contour banding, and soft forming processes and slot die, extrusion head, and wheel roller (e.g., gravure wheel roller) coating methods.

The composition is suitable for use in a variety of articles including, e.g., doors, windows, furniture including, e.g., office furniture, countertops, closet organizers, and shelves.

The invention will now be described further by way of the following examples. All parts, ratios, percents and amounts stated in the Examples are by weight unless otherwise specified.

EXAMPLES

Test Procedures

Test procedures used in the examples include the following.

Ring and Ball Softening Point

The Ring and Ball softening point of a composition is tested according to ASTM E-28-99 entitled, "Test method for Softening Point by Ring and Ball Apparatus (1999)."

Molten Gardner Color

The Gardner color of a composition is tested in the molten state according to ASTM D-1544-98 entitled, "Test Method for Color of Transparent Liquids (Gardner Color Scale) (1998)."

Specific Gravity

The specific gravity of a composition is tested according to ASTM D792-00 entitled, "Test Method for Density and Specific Gravity (Relative Density) of Plastics by Displacement (2000)," using isopropyl alcohol as the carrier liquid.

Viscosity

Viscosity is determined according to ASTM D-323-88 (1999), entitled, "Test Method for Apparent Viscosity of Hot Melt Adhesives and Coating Materials 1988 (1999)," using a Brookfield Viscometer RVT SC-4, Spindle 29 at 5 rotations per minute. The composition is heated to 204° C. prior to testing.

Heat Stability

Heat stability is determined according to ASTM D-4499-95 entitled, "Test Method for Heat Stability of Hot Melt Adhesives (2000)."

A 300 gram sample is placed in a glass beaker and aged at 204° C. for 200 hours in an air circulating oven. The sample is then observed for the presence of charring, color change, and skin formation. Viscosity is measured at various time intervals over the 200 hour period.

Heat Resistance

A sample hot melt adhesive composition is placed in a suitable glue pot on which a roller applicator has been vertically mounted. Particle board is moved horizontally along the roller causing the hot melt adhesive composition to be applied uniformly to the edge of the particle board. An edgeband, e.g., paper, wood or plastic strip, is then automatically fed onto the adhesive coated edge of the first substrate and pressed against the edge by a series of rollers. The applied edgeband is then trimmed in-line such that the edgeband is flush with the wood substrate.

The article is then conditioned at room temperature (about 25° C.) for a minimum of 24 hours. The article is then placed in an oven at 50° C. for 1 hour. The bond is examined for any signs of delamination. If no delamination has occurred, the sample is placed back in the oven at 60° C. for 1 hour. The oven temperature is increased 10° C./hour and the sample is checked every hour until delamination has occurred or until the temperature of 150° C. has been reached.

The heat resistance temperature is an average of several articles tested.

Sample Preparation

Hot melt compositions were prepared by gradually adding the components of the composition to a high shear mixer heated to 185° C. Mixing continued until all components were melted and the molten product was uniform. A nitrogen blanket was present over the sample during mixing. The composition was then placed into containers.

Example 1

A hot melt composition was prepared by combining the following components according to the sample preparation method: 45% by weight ATEVA 2803A ethylene-vinyl acetate (EVA) (AT Plastics Inc., Brampton, Ontario), 19% by weight ATEVA 1880A EVA (AT Plastics Inc.), 35.4% by weight ESCOREZ 5400 hydrogenated petroleum hydrocarbon resin (Exxonmobil Chemical, Houston Tex.), and 0.6% by weight BNX 1010 hindered phenol antioxidant (Mayzoo, Inc., Nocross, Ga.).

Example 2

A hot melt composition was prepared by combining the following components according to the sample preparation method: 44% by weight ATEVA 2803A, 20% by weight ATEVA 1880A, 25.4% by weight SUKAOREZ SU-120 hydrogenated-DCPD Hydrocarbon ($C_5$) Resin (Tryline Company, Inc., Seattle Wash.), 10% by weight CUMAR LX-509 coumarone indene resin (Neville Chemical Co., Pittsburgh, Pa.), and 0.6% by BNX 1010 antioxidant.

Example 3

A hot melt composition was prepared by combining the following components according to the sample preparation method: 42.91% by weight ATEVA 2803A, 21.09% by weight ATEVA 1880A, 35.5% by weight EASTOTAC H100R hydrogenated hydrocarbon $C_{6-20}$ resin (Eastman Chemical Co., Kingsport, Tenn.), and 0.6% by weight BNX 1010 antioxidant.

Example 4

A hot melt composition was prepared by combining the following components according to the sample preparation method: 46% by weight ATEVA 2803A, 17% by weight ATEVA 1880A, 34.4% by weight ESCOREZ 5415 hydrogenated petroleum hydrocarbon resin, (Exxonmobil Chemical, Houston, Tex.), 2% by weight BARECO C-4040 polyethylene wax (Bareco Products, Rock Hill, S.C.), and 0.6% by weight BNX 1010 antioxidant.

Example 5

A hot melt composition was prepared by combining the following components according to the sample preparation method: 44% by weight ATEVA 2803A, 20% by weight ATEVA 1880A, 35.4% by weight SUKAOREZ SU120 hydrogenated-DCPD hydrocarbon ($C_5$) resin, and 0.6% by weight BNX 1010 antioxidant.

The compositions of Example 1–5 were tested for viscosity, softening point, heat resistance and Gardner color according to the above-described methods. The results are reported in Table 1.

TABLE 1

| Example | Viscosity (cps) | Ring & Ball Softening Point (° C.) | Heat Resistance (° C.) | Molten Gardner Color |
|---|---|---|---|---|
| 1 | 100,000 | 112.5 | 75 | 1 |
| 2 | 116,000 | 111.7 | ND | 2 |
| 3 | 80,000 | 110.3 | 80 | ND |
| 4 | 94,500 | 108 | 85 | 2 |
| 5 | 96,620 | 110.5 | ND | 2 |

ND = not determined

Other embodiments are within the claims.

What is claimed is:

1. A hot melt adhesive composition comprising:
   from about 30% by weight to about 55% by weight of a first ethylene-vinyl acetate copolymer comprising from about 25% vinyl acetate to about 30% vinyl acetate based upon the weight of the first copolymer and having a melt index of no greater than 4 g/10 min;
   a second ethylene-vinyl acetate copolymer comprising no greater than about 28% vinyl acetate based upon the weight of the second copolymer and having a melt index of from about 400 g/10 min to about 2500 g/10 min; and
   hydrogenated petroleum hydrocarbon resin.

2. The hot melt adhesive composition of claim 1, wherein said second ethylene-vinyl acetate copolymer has a melt index from about 400 g/10 min to about 800 g/10 min.

3. The hot melt adhesive composition of claim 1, wherein said second ethylene-vinyl acetate copolymer has a melt index from 400 g/10 min to about 600 g/10 min.

4. The hot melt adhesive composition of claim 1, wherein said second ethylene-vinyl acetate copolymer comprises no greater than 20% vinyl acetate based upon the weight of the second copolymer.

5. The hot melt adhesive composition of claim 1, wherein said second ethylene-vinyl acetate copolymer comprises firm about 14% to about 20% vinyl acetate based upon the weight of the second copolymer.

6. The hot melt adhesive composition of claim 1, wherein said second ethylene-vinyl acetate copolymer comprises from about 16% to about 20% vinyl acetate based upon the weight of the second copolymer.

7. The hot melt adhesive composition of claim 1 comprising from about 15% by weight to about 30% by weight said second ethylene-vinyl acetate copolymer.

8. The hot melt adhesive composition of claim 1 comprising
   from about 15% by weight to about 30% by weight said second ethylene-vinyl acetate copolymer.

9. The hot melt adhesive composition of claim 1 comprising
   from about 40% by weight to about 50% by weight said first ethylene-vinyl acetate copolymer; and from about 15% by weight to about 25% by weight said second ethylene-vinyl acetate copolymer.

10. The hot melt adhesive composition of claim 1 comprising from about 25% by weight to about 40% by weight hydrogenated petroleum hydrocarbon resin.

11. The hot melt adhesive composition of claim 1 comprising from about 30% by weight to about 40% by weight hydrogenated petroleum hydrocarbon resin.

12. The hot melt adhesive composition of claim 1 further comprising an agent selected from the group consisting of pigment, dye, and combinations thereof.

13. The hot melt adhesive composition of claim 12, wherein said pigment is selected from the group consisting of titanium dioxide, carbon black, compounded pigments, and combinations thereof.

14. The hot melt adhesive composition of claim 1, wherein said composition, when molten, appears clear to the human eye.

15. The hot melt adhesive composition of claim 1, wherein said composition exhibits a Molten Gardner color of no greater than 4.

16. The hot melt adhesive composition of claim 1, wherein said composition exhibits a Molten Gardner color of no greater than 3.

17. The hot melt adhesive composition of claim 1, wherein said composition exhibits a Molten Gardner color of no greater than 2.

18. The hot melt adhesive composition of claim 1, wherein said composition is essentially free of stringing when used in an edgebanding apparatus in which the composition is applied to a substrate using a roller.

19. The hot melt adhesive composition of claim 1, wherein said composition is essentially free of stringing when used in an edgebanding apparatus in which the composition is applied to a substrate using a roller at a substrate speed of at least 10 meters/minute.

20. The hot melt adhesive composition of claim 1, wherein said composition is essentially free of stringing when used in an edgebanding apparats in which the composition is applied to a substrate using a roller at a substrate speed of at least 50 meters/minute.

21. The hot melt adhesive composition of claim 1, wherein said composition exhibits a viscosity of no greater than 140,000 centipoise at 204° C.

22. The hot melt adhesive composition of claim 1, wherein said composition exhibits a viscosity of from about 80,000 centipoise to about 140,000 centipoise at 204° C.

23. The hot melt adhesive composition of claim 1, wherein said composition exhibits a viscosity of from about 100,000 centipoise to about 130,000 centipoise at 204° C.

24. The hot melt adhesive composition of claim 1, wherein said composition is essentially free of inorganic filler.

25. The hot melt adhesive composition of claim 1 further comprising antioxidant.

26. The hot melt adhesive composition of claim 1, wherein said composition exhibits no greater than 50% change in viscosity over a period of 200 hours at 204° C.

27. The hot melt adhesive composition of claim 1, wherein said composition exhibits no greater than 30% change in viscosity over a period of 200 hours at 204° C.

28. A hot melt adhesive composition comprising:
from about 30% by weight to about 55% by weight of a first ethylene-vinyl acetate co polymer comprising from about 25% vinyl acetate to about 30% vinyl acetate based upon the weight of the first co polymer and having a melt index of no greater than 4 g/10 min;
a second ethylene-vinyl acetate copolymer comprising from about 16% vinyl acetate to about 20% vinyl acetate based upon the weight of the second copolymer and having a melt index of from about 400 g/10 min to about 600 g/10 min;
hydrogenated petroleum hydrocarbon resin; and
antioxidant.

* * * * *